(12) United States Patent
Di Serio et al.

(10) Patent No.: US 11,046,110 B2
(45) Date of Patent: *Jun. 29, 2021

(54) METHOD FOR MANUFACTURING A LIGHT-ALLOY HYBRID WHEEL INCLUDING A FRONT FLANGE AND A RIM

(71) Applicant: SAINT JEAN INDUSTRIES, Saint Jean D'Ardieres (FR)

(72) Inventors: Emile Thomas Di Serio, Chenas (FR); Lionel Duperray, Saint Jean D'Ardieres (FR)

(73) Assignee: SAINT JEAN INDUSTRIES, Saint Jean d'Ardieres (FR)

( * ) Notice: Subject to any disclaimer, the term of this patent is extended or adjusted under 35 U.S.C. 154(b) by 71 days.

This patent is subject to a terminal disclaimer.

(21) Appl. No.: 15/536,044

(22) PCT Filed: Dec. 17, 2015

(86) PCT No.: PCT/FR2015/053589
§ 371 (c)(1),
(2) Date: Jun. 14, 2017

(87) PCT Pub. No.: WO2016/097627
PCT Pub. Date: Jun. 23, 2016

(65) Prior Publication Data
US 2017/0341122 A1    Nov. 30, 2017

(30) Foreign Application Priority Data

Dec. 17, 2014  (FR) ...................................... 1462671

(51) Int. Cl.
*B60B 3/04*    (2006.01)
*B21D 53/30*   (2006.01)
(Continued)

(52) U.S. Cl.
CPC .............. *B60B 3/041* (2013.01); *B21D 22/16* (2013.01); *B21D 53/30* (2013.01); *B22F 3/10* (2013.01);
(Continued)

(58) Field of Classification Search
CPC ......... B60B 3/041; B60B 3/044; B60B 3/045; B60B 21/02; B60B 2310/214;
(Continued)

(56) References Cited

U.S. PATENT DOCUMENTS 3,046,924 A * 7/1962 Kanc ...................... B21D 22/16
                                                      29/894.325
3,535,002 A * 10/1970 Stamm ................... B21D 53/90
                                                      228/114.5
(Continued)

FOREIGN PATENT DOCUMENTS

EP    0119365 A1   9/1984
EP    0854792 A1   7/1998
(Continued)

OTHER PUBLICATIONS

Machine Translation for FR-2985205-A1 (Year: 2013).*
(Continued)

*Primary Examiner* — Christopher J Besler
*Assistant Examiner* — Christine Bersabal
(74) *Attorney, Agent, or Firm* — Heslin Rothenberg Farley & Mesiti P.C.; Kristian E. Ziegler, Esq.

(57) ABSTRACT

A process for manufacturing a light-alloy hybrid wheel, implements the following separate operation phases: making a flange with an internal profile capable of constituting a tire bead seat; making a rim with, on one side, an outer profile capable of constituting a tire bead seat and, on the other side, a circular flank for assembly with a part of the flange; and assembling the flange with the rim, at the seat of said flange (Continued)

and the circular flank of the rim. The rim is made according to the following consecutive operations: an operation of manufacturing a circular flank; then an operation of expanding said circular flank to the size of the final rim in a single step; then an operation of cold or hot flospinning of said circular flank so as to obtain the rim in the final shape and profile thereof, comprising a shoulder only on the side that will not be welded to the flange.

21 Claims, 2 Drawing Sheets

(51) Int. Cl.
    *B60B 21/02* (2006.01)
    *B21D 22/16* (2006.01)
    *B22F 3/10* (2006.01)
    *B23K 20/12* (2006.01)
    *B23K 26/28* (2014.01)

(52) U.S. Cl.
    CPC ............ *B23K 20/122* (2013.01); *B23K 26/28* (2013.01); *B60B 3/044* (2013.01); *B60B 3/045* (2013.01); *B60B 21/02* (2013.01); *B60B 2310/202* (2013.01); *B60B 2310/208* (2013.01); *B60B 2310/214* (2013.01); *B60B 2310/228* (2013.01); *B60B 2310/3025* (2013.01); *B60B 2310/3026* (2013.01); *B60B 2360/104* (2013.01); *B60B 2900/112* (2013.01)

(58) Field of Classification Search
    CPC ....... B60B 2900/112; B60B 2310/3026; B60B 2360/106; B60B 2900/111; B60B 2310/228; B60B 2310/202; B60B 2310/204; B60B 2310/208; B60B 2310/3025; B60B 2360/104; B60B 2360/108; B23K 20/122; B23K 26/28; B21D 22/16; B21D 53/30; B22F 3/10

See application file for complete search history.

(56) References Cited

U.S. PATENT DOCUMENTS

| | | | | |
|---|---|---|---|---|
| 4,436,133 A | | 3/1984 | Rohr | |
| 4,483,820 A | * | 11/1984 | Schelb | B22F 3/10 164/15 |
| 5,271,663 A | | 12/1993 | Maldini et al. | |
| 5,360,261 A | * | 11/1994 | Archibald | B23K 9/028 301/63.107 |
| 6,530,624 B2 | * | 3/2003 | Stach | B60B 1/08 301/65 |
| 6,536,111 B1 | * | 3/2003 | Baumgarten | B21D 53/30 164/302 |
| 6,757,976 B2 | * | 7/2004 | Baek | B21D 53/30 29/412 |
| 2014/0299581 A1 | * | 10/2014 | Keller | B23K 10/02 219/74 |

FOREIGN PATENT DOCUMENTS

| | | | | |
|---|---|---|---|---|
| EP | 1230099 A1 | | 8/2002 | |
| FR | 2981605 A1 | | 4/2013 | |
| FR | 2985205 A1 | * | 7/2013 | ................ B21J 3/00 |
| JP | S60158933 A | * | 8/1985 | ............ B21D 53/30 |
| JP | 2001206262 A | | 7/2001 | |

OTHER PUBLICATIONS

Machine Translation for JPS60158933 A (Year: 1985).*
International Search Report issued in PCT/FR2015/053589, dated Apr. 25, 2016.

* cited by examiner

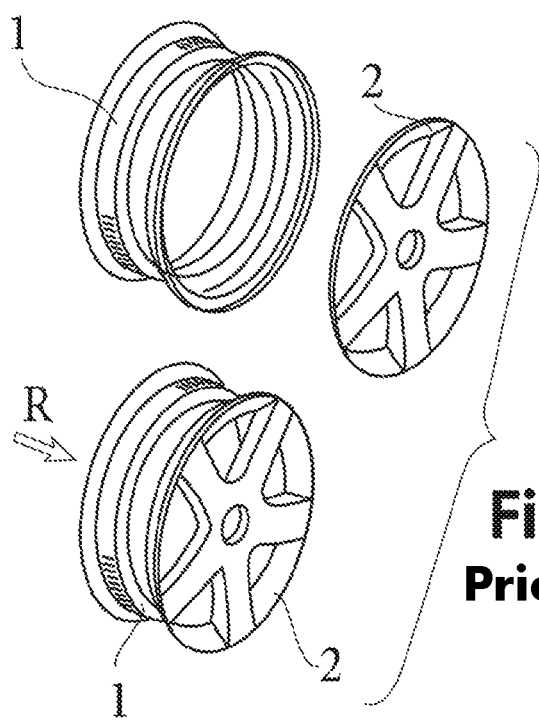
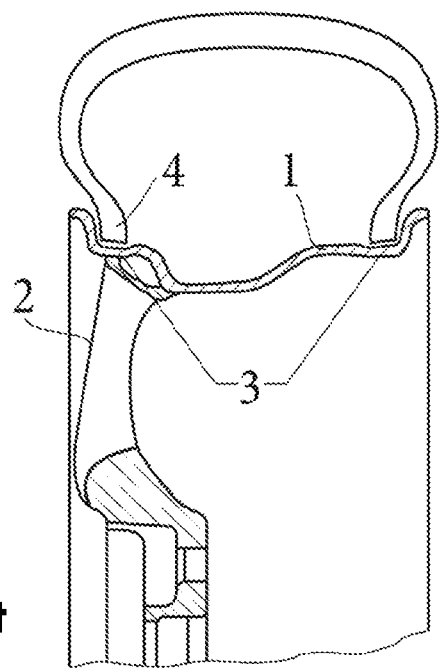
Fig. 1 Prior Art
Fig. 2
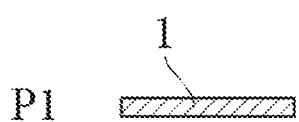
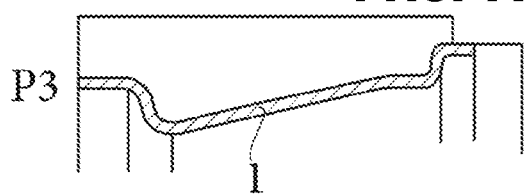
Fig. 3 Prior Art
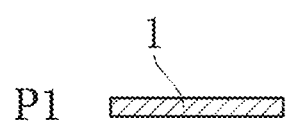
Fig. 4

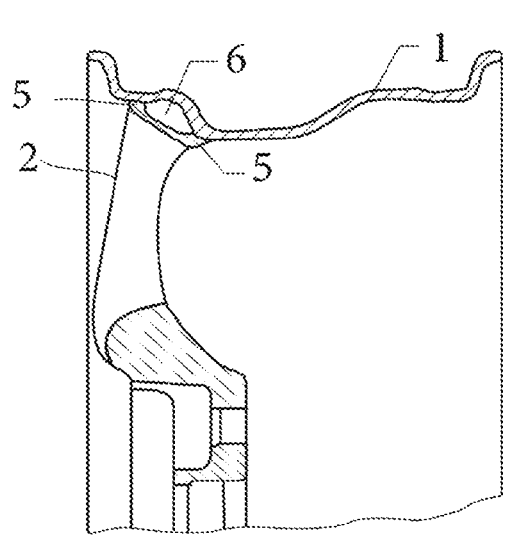
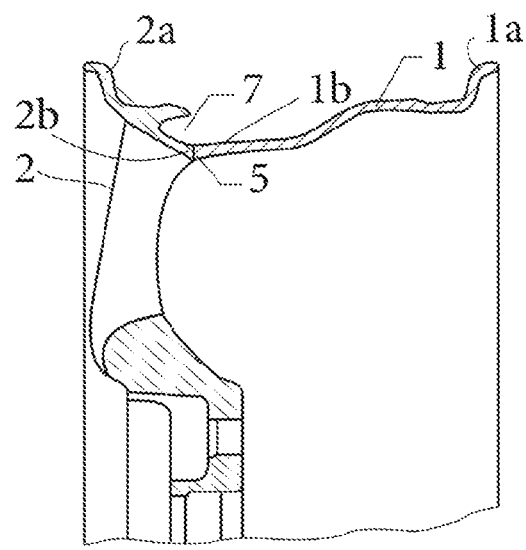
Fig. 5
Prior Art
Fig. 6
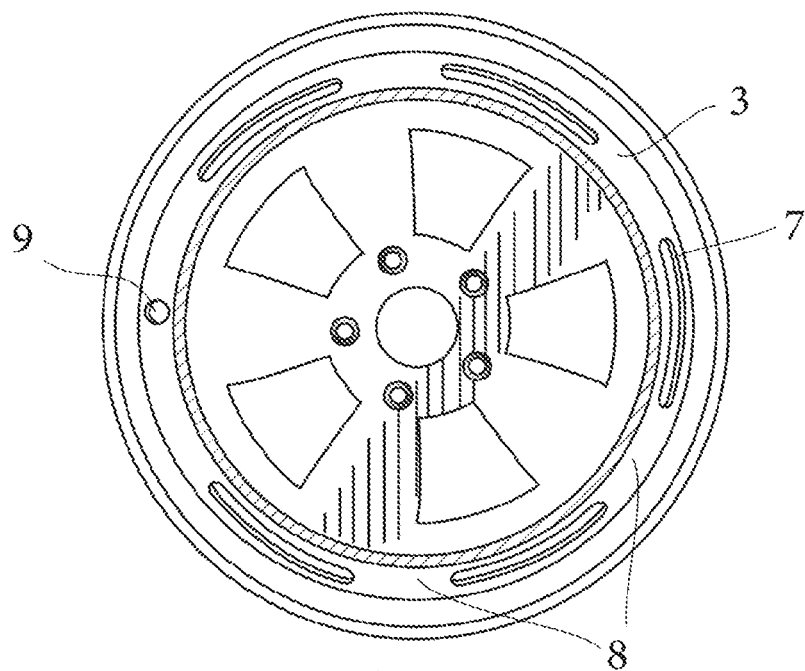
Fig. 7

METHOD FOR MANUFACTURING A LIGHT-ALLOY HYBRID WHEEL INCLUDING A FRONT FLANGE AND A RIM

CROSS REFERENCE TO RELATED APPLICATIONS

This application is the National Phase filing under 35 U.S.C. § 371 of International Application No. PCT/FR2015/053589, filed on Dec. 17, 2015, and published on Jun. 23, 2016 as WO/2016/097627A1, and claims priority to French Application No. 1462671, filed on Dec. 17, 2014. The contents of each of the prior applications are hereby incorporated by reference herein in their entirety.

BACKGROUND ART

The invention relates to the technical sector of wheels, particularly for vehicles, motor vehicles, and also to the foundry and forging sectors for the manufacture of parts in light alloy, for example based upon aluminum or magnesium, designed particularly for the automotive industry.

Known for example is the implementation of a wheel with a monoblock rim and flange obtained by molding, but requiring complex and costly technical means and recovering very substantial thickness dimensions, resulting in the weight of the wheel thus obtained being too great in relation to current requirements.

In terms of the prior art according to FIG. 1, in relation to the two aforementioned aspects, already known are hybrid wheels (R) in two parts comprising a rim (1) part and a front flange (2) or the wheel flange, these two parts being joined together by different connecting means.

One effective means was proposed for example in the patent EP 0 854 792 which corresponds to a hybrid wheel in two parts which is obtained according to a particular process. The connection between the rim and the flange is provided by a weld obtained by means of a friction stir welding operation. This technology, which is being exploited by one of the subsidiaries of the Applicant adequately responds to the demands of the market. However, the implementation of this process causes some drawbacks in relation to new market requirements which are for example to obtain a reduction in the weight of products in the order of 20 to 30% while maintaining a competitive price. Moreover, in the patent EP 0 854 792, the wrought rim of the wheel is based on a centrifugally cast tube that is transformed by lamination or by friction in order to obtain the configuration of the final rim. These operations are long and costly.

On the other hand, the Applicant makes use of a technology that combines a foundry step and a forging step for aluminum alloy parts, known by the brand name "COBAPRESS". This technology is defined in the patent EP 119 365 and consists in producing a foundry preform by casting of light aluminum alloy, then in transferring the preform thus obtained to a forging die with significantly smaller dimensions than the dimensions of the preform to then perform a forging operation thus making it possible to have the properties of the final part to be obtained. A deburring operation is then performed on the edge of the final piece obtained after forging.

The applicant is already using this technology to produce wheels as defined in patent FR 2 981 605, of which he is also the title holder. In this patent, the flange of the wheel is manufactured using COBAPRESS technology that allows for a gain in weight. The flange is subjected to a forging step between two dies during this process. This forging step is expensive, especially for small series wherein the manufacturing of these forging dies has a significant impact upon cost.

It is recalled that wheel rims must be arranged with profiles that act as seats (3) in order to support and restrain the beads of the tire (4). In order to obtain a reduction in this area, a recess was implemented by the creation of a cavity (6) between the two welds (5) intended to connect the rim part (1) to the flange part (2), (FIG. 5).

Other solutions have been proposed according to the prior art. Thus, from the point of view of the reduction in weight of the flange, different recess solutions for the tire bead seat have been described.

For example, in the patent EP 1230099, the title holder discloses a solution wherein one of the tire bead seats extends inward from the inner surface of the wall of the wheel rim such that it is self-supporting, while an outer profile of the wheel rim is not imposed by the inner profile of the wheel rim. This shape, which extends over the entire circumference of the part, allows for a reduction in weight but the drilling and positioning of the valve are difficult to implement with this configuration.

The patent U.S. Pat. No. 5,271,663 describes another example embodiment, but using a different manufacturing technology. Recesses are made by machining in low stress areas of the tire bead seat. These recesses allow for a reduction in weight as well as for balancing of the wheel. However, the machining of these recesses is a long and expensive operation.

Thus, according to the aforementioned prior art, existing solutions for the implementation of recesses within the tire bead seat require significant metal removal and are therefore costly and time-consuming.

The patent U.S. Pat. No. 6,536,111 describes another example embodiment of a hybrid wheel in two parts. The rim is made by the rolling of a strip of metal and then the welding end to end of both ends of this strip. The front flange is made by casting or forging, integrating recesses in the tire bead seat. The rim and the front flange are then assembled by welding, for example by electron beam, arc welding, friction or inertia. This second welding operation is performed on the outside of the wheel which is then machined.

The approach of the Applicant was therefore, based upon the technologies cited above, to consider a design solution for a two-piece light-alloy hybrid wheel, improved in relation to known solutions and that would respond to the needs of the market.

The applicant was therefore led to design and develop a new process beginning with a specific selection of operational phases.

BRIEF SUMMARY OF THE INVENTION

Thus, according to a first characteristic of the invention, the manufacturing process for a light-alloy hybrid wheel, particularly based on aluminum or magnesium, including a front flange and a rim, implements the following different operational phases, according to which:
- the flange is made with an internal profile capable of constituting a tire bead seat;
- the rim is made with, on one side, an external profile capable of constituting a tire bead seat, and on the other side, a circular flank for assembly with a part of the flange;
- the flange is assembled to the rim, at the seat of said flange and the circular flank of the rim.

The process is characterized in that the rim is made according to the following consecutive operations:
- an operation of manufacturing a circular flank; then
- an operation of expanding said circular flank to the size of the final rim in a single step; then
- an operation of cold or hot flospinning of the circular flank so as to obtain the rim in the final shape and profile thereof, comprising a shoulder only on the side that will not be welded to the flange.

In practice, during the manufacturing operation, the circular flank can be obtained using any technique suitable for the intended application.

According to a preferred embodiment, the circular flank is made by hot or cold extrusion of a light alloy billet.

As an alternative, the circular flank is made by foundry casting.

As an alternative, the circular flank is made by powder sintering.

Other techniques can be implemented in order to manufacture the circular flank, without going beyond the scope of the invention.

Preferably, the expansion operation and flospinning operation are cold-made.

Advantageously, recesses are made in the seat of the flange, said recesses do not cover the circumference of the wheel, and have a U-shaped profile oriented in the direction of the rim assembly circular area.

The flange can be made by casting, forging, or by a dual casting and forging operation.

According to a first embodiment, the dual casting and forging operation comprises a casting operation of a foundry preform, a transfer of said foundry preform into a forging die, a forging operation of said foundry preform in order to obtain the flange, and a deburring to obtain said flange.

According to a second embodiment, the dual casting and forging operation comprises a casting operation of a foundry perform, a storage of said foundry preform, a transfer of said foundry preform into an oven allowing it to be heated, a transfer of said preform mold into a forging die, a forging operation of said foundry preform in order to obtain the flange, and a deburring to obtain said flange.

Preferably, when the flange is made by a dual casting and forging operation, the recesses are formed within the tire bead seat on the flange during the casting operation.

In a preferred embodiment, the assembly of the rim and the flange is made by welding the circular flank of the rim and the flange by means of a single friction stir weld using a pin, in a position that allows access to both sides of the weld.

Friction welding using a pin is known as "Friction Stir Welding" or FSW in English. The welding is performed by mixing the material to a paste state, i.e. to a solid phase. This technique makes it possible to weld alloys (such as aluminum) that are non-weldable or hardly weldable using conventional techniques, involving the fusion of the material. Additionally, solid phase welding makes it possible to avoid the formation of bubbles that are likely to occur during a liquid-solid transition. The material undergoes a smaller temperature increase, such that the thermally affected zone (TAZ) has better mechanical properties when compared to conventional techniques. The strength of the weld under static stress and fatigue is thus improved.

More preferably:
- The friction stir welding is preceded by a machining operation of assembly zones;
- The friction stir welding is followed by a machining operation on both sides (internal and external) of the weld in order to remove burring and any eventual defects at the bottom of the weld.

Alternatively, this assembly is made by other welding processes comprising a thermally affected zone.

For example, the weld may be obtained by laser or hybrid laser, by friction stir welding between the two elements, or by means of CMT (Cold Metal Transfer) technology developed and patented by Fronius.

Regardless of the selected assembly mode, the wheel preferably has a single weld, which is the one made between the flange and rim. The method thus offers many advantages, the expansion and flospinning operations are particularly simplified compared to the patents FR 2 981 605 and EP1230099B1 due to the use of a single weld instead of two.

As with the patents EN 2 981 605 and EP1230099B1, the wheel perfectly meets manufacturer specifications in terms of impact resistance insofar as it has greater weight gain compared to traditional foundry made wheels.

Compared to the previously mentioned patent, the invention allows to simplify the expansion operation which occurs in a single step instead of two, and to simplify the flospinning operation because the geometric profile of the final rim profile is much less complex due to the single weld. It should also be noted that a single weld allows for a greater variety of flange designs.

These and other characteristics will clearly emerge from the remainder of the description.

BRIEF DESCRIPTION OF THE DRAWING FIGURES

In order to associate the object of the illustrated invention in a non-limiting manner to the figures of the drawings, FIG. 1 illustrates, according to the prior art, the implementation of a hybrid wheel in two parts with a rim part and a front flange part.

FIG. 2 illustrates the mounting of the tire on the rim with the positioning of the tire beads on the seats thereof.

FIG. 3 schematically illustrates, according to the prior art, the successive operations P1, P2, P3 in order to obtain the profile of the rim.

FIG. 4 schematically illustrates according to the invention the successive operations (obtaining a circular flank) P1, P2 (expansion of said circular flank), P3 (circular flank flospinning operation in order to obtain the profile of the rim).

FIG. 5 is a section view showing the profile of the rim according to the prior art, with a cavity formed on the rim.

FIG. 6 is a section view showing the profile of the rim according to the invention with the implementation of a single weld and the formation of recesses within one of the tire bead seats.

FIG. 7 is a front view of the hybrid wheel with an illustration of the recesses.

DETAILED DESCRIPTION

In order to render the object of the invention more concrete, it is herein described in a non-limiting manner and illustrated in the figures of the drawings.

As previously noted, the profile of the rim (1) is simplified by the execution of a single weld (5) for the assembly thereof with the flange (2). The rim (1) has a circular profile (1a) that acts as a seat for the tire but only on the inside of the wheel. The other profile (2a), acting as a seat for the tire, is implemented by the flange (2).

Hereinafter are highlighted certain features and advantages of the process of the invention.

FIGS. 3 and 4 illustrate the steps for obtaining the rim (1), according to the prior art and the invention respectively.

Within the scope of the invention, the rim (1) is made according to an operation (P1) of the production of a blank in the form of circular flank (1b); then an operation (P2) of expanding said circular flank (1b) to the dimensions of the final rim (1) in a single step; and finally an operation (P3) of cold or hot flospinning the circular flank (1b) so as to obtain the rim (1) in the final shape and profile thereof, with the remaining part of the circular flank (1b) on the side that will be welded to the flange (2) and a shoulder (1a) only on the side that will not be welded to the flange (2).

According to one preferred embodiment of the manufacturing operation (P1), a light-alloy billet is made, this billet is then transformed into a circular flank (1b) by hot or cold extrusion. In comparison to other known techniques, this allows a flank to be obtained (1b) that has very significant elongation. The flank expansion operation (1b) can thus be cold-made, i.e., at room temperature, which prevents warming before the expansion thereof. In addition, this greater elongation makes it possible to perform a cold flospinning operation (P3) after the cold expansion (P2) operation. The material of the rim (1) is subjected to significant hardening during the cold flospinning operation (P3). Before welding the flange (2), the rim (1) is therefore subjected to heat treatment (for example T6: solution heat treating and aging), during which the energy stored during the hardening is recuperated. This makes it possible to obtain fine recrystallized grains within the material of the rim (1). The microstructure thereof is therefore very fine and the mechanical features of the rim (1) are improved in comparison to a hot conditioning technique.

In the P3 step, in FIG. 3, the profile is illustrated of the rim (1) which is required in order to obtain the cavity (6) illustrated in FIG. 5 when the connection between the flange and rim is made using two welds. The simplified rim profile (1) can be seen in the P3 step of FIG. 4. This profile is in fact much simpler than that shown in the patent FR 2 981 605, illustrated in the P3 step of FIG. 3. This simplification is made possible due to the use of a single weld (5) implemented on the wheel of the invention. The external profile (1a) of the rim (1) in fact requires only one shoulder constituting a tire bead seat, instead of two. The result is a gain in cycle time and a simplification to the flospinning machine, which reduces costs. The other profile (2a), acting as a seat for the tire, is implemented by the flange (2).

Having a single weld (5) as shown in FIG. 6 also greatly simplifies the welding operation in comparison to double welding. Indeed, the welding is performed in one direction, perpendicular to the rim unlike the double welded wheel wherein the welds are in two different directions. It is no longer necessary to rotate the welding rod and the assembly is simplified and therefore less expensive, while there is a gain in cycle time and in the wear of the welding rod. The welding operation (5) is performed at the junction of the part (2B) of the flange (2) and of the circular flank (1b) of the rim (1).

In addition, having a single weld (5) makes it possible to access both sides of the weld. It is then possible to machine both sides of the weld. This machining which is commonly used with panels for aeronautics, makes it possible to remove any welding burrs and defects at the bottom of the weld that are often present with friction stir welding. These defects correspond to bad mixing of the alloy which creates non-welded seams at the bottom of the weld. The non-welded burrs or lips are defects that lead to the onset of cracking when there is fatigue stressing of the wheel. The removal thereof is therefore a great advantage from the point of view of the reliability of the process. Access to both sides of the weld also makes it possible to perform a frequency penetration test on the weld in order to ensure the stability of the welding process and to ensure the absence of defects. For a wheel with two welds, access to both sides of the weld is not assured. It is therefore necessary to section a wheel in order to perform this frequency test. In so far as this test is destructive, it results in the loss of part of the production and therefore an increase in costs for wheels with a closed cavity (6).

Laser and CMT welding, even though they are characterized by worse mechanical characteristics, may have an economic advantage. Indeed, laser welding can be competitive for very large runs and CMT welding requires a smaller investment. The mechanical characteristics of these welds are even better than those of MIG or TIG insofar as the thermally affected zone is reduced and fatigue resistance results are improved. They are still less resistant than FSW welds and requires more checking insofar as the welding is performed in the liquid phase. For the same mechanical performance of the part, a material thickness will be required, which will result in the wheel being slightly overweight. The use thereof will therefore be reflected in terms of cost and increased weight.

In a significant manner for the invention, the valve area is also greatly simplified. Indeed, for a wheel with two welds, the hole for the valve leads to an opening in the cavity (6). The majority of manufacturers do not want to have cavities within the wheels insofar as said opening leads to the possibility of the retention of water, gravel or other objects. A weld around the hole of the valve was therefore required in order to close the cavity (6) and to prevent water retention. This weld therefore represented an addition to the process presented in the patents FR 2981605 and EP 1230099, resulting in an additional cost.

In addition, making the wheel in two parts before welding makes it possible to implement more complex forms, that would not demoldable in a single part wheel. This technology makes it possible to implement recesses (7) at the flange (2), for example, in the form of cavities, as can be seen in FIG. 7. These recesses are made either in a foundry, or a forge, or during the foundry step of the "COBAPRESS" process. They are located at one of the tire bead seats (3) that has the flange (2) and that does not cover the circumference of the wheel. Indeed, these areas (8) are solid in order to increase the stiffness and resistance of the wheel. These solid areas (8) also greatly assist in fitting the tire. Indeed, without these solid areas the tire bead can be lodged within the cavities (7) during assembly. This tire bead can be difficult to position within the seat thereof during assembly and having solid areas creates a slope which greatly assists in this operation.

An area is also left without a recess in order to allow for the drilling and the positioning of the valve with a simple geometry (9), as can be seen from FIG. 7. The recesses (7), as shown in FIGS. 6 and 7, have a weld (5) side U-shaped profile.

Making recesses is not new. In practice, the implementation of these recesses during a forging or foundry step is economical insofar as it does not require a machining operation. This saves both cycle time and cost. The threshold value, i.e., the quantity of material involved with respect to useful material, is also reduced.

In practice and according to the invention, this is remarkable due to the combination of different phases of the process that on a practical level have a very large number of advantages over the prior art. It is therefore an optimization that has required significant research and development investments and that did not stem from the teaching of the prior art.

The invention claimed is:

1. A manufacturing process for a light-alloy hybrid wheel including a front flange and a rim, the process implementing the following separate operational phases:
    obtaining the flange, the flange being made with an internal profile constituting a first tire bead seat;
    obtaining the rim, the rim being made with, on one side, an external profile constituting a second tire bead seat, and on another side, a circular flank for assembly with a part of the flange;
    assembling the flange and the rim at the first tire bead seat of said flange and the circular flank of the rim, the flange and the rim being separate and distinct components prior to being assembled; and
    wherein the rim is made, prior to assembly with the flange, according to the following consecutive operations:
        an operation of extruding, casting or sintering to form the circular flank without welding;
        an operation of expanding said formed circular flank from a first size to a second size in a single step, the second size approximating a final size of the rim as compared to the first size; and
        an operation of cold or hot flow-forming of the expanded circular flank so as to obtain the rim at the final size with a final shape and profile thereof, comprising forming a shoulder and the second tire bead seat only on a side that will not be assembled with the flange.

2. The manufacturing process according to claim 1, wherein the forming of the circular flank comprises hot or cold extrusion of a light alloy billet.

3. The manufacturing process according to claim 1, wherein the forming of the circular flank comprises casting the circular flank in a foundry.

4. The manufacturing process according to claim 1, wherein the forming of the circular flank comprises forming powder sintering the circular flank.

5. The manufacturing process according to claim 1, wherein expanding the circular flank and cold or hot flow-forming the circular flank are cold-made processes.

6. The manufacturing process according to claim 1, further comprising forming recesses in the first tire bead seat of the flange, said recesses do not cover a circumference of the wheel, and have a U-shaped profile oriented in a direction of the circular flank of the rim.

7. The manufacturing process according to claim 1, wherein the flange is made by casting.

8. The manufacturing process according to claim 1, wherein the flange is made by forging.

9. The manufacturing process according to claim 1, wherein the flange is made by a dual casting and forging operation.

10. The manufacturing process according to claim 9, wherein the dual casting and forging operation comprises a casting operation of a foundry preform, a transfer of said foundry preform into a forging die, a forging operation of said foundry preform in order to obtaining the flange, and a deburring operation of the flange.

11. The manufacturing process according to claim 9, wherein the dual casting and forging operation comprises a casting operation of a foundry preform, a storage of said foundry preform, a transfer of said foundry preform into an oven allowing the foundry preform to be heated, a transfer of said foundry preform into a forging die, a forging operation of said foundry preform in order to obtain the flange, and a deburring operation of the flange.

12. The manufacturing process according to claim 6, wherein the flange is made by a dual casting and forging operation, and the recesses are formed within the first tire bead seat on the flange during the casting operation.

13. The manufacturing process according to claim 1, wherein assembling of the rim and the flange comprises welding the circular flank of the rim and the flange by a single friction stir weld using a pin, in a position that allows access to outer-facing and inner-facing sides of the weld.

14. The manufacturing process according to claim 13, wherein the welding by a single friction stir weld is preceded by a machining operation of assembly zones.

15. The manufacturing process according to claim 13, wherein the welding by a single friction stir weld is followed by a machining operation on both outer-facing and inner-facing sides of the weld in order to remove burring and any eventual defects at a bottom of the weld.

16. The manufacturing process according to claim 1, wherein assembling the rim and the flange comprises welding the circular flank of the rim and the flange with a weld obtained by CMT (Cold Metal Transfer) technology.

17. The manufacturing process according to claim 1, wherein assembling the rim and the flange comprises welding the circular flank of the rim and the flange with a weld obtained by laser or hybrid laser.

18. The manufacturing process according to claim 1, wherein assembling the rim and the flange comprises welding the circular flank of the rim and the flange with a weld obtained by friction stir welding with cyclical movement between the rim and the flange.

19. The manufacturing process according to claim 1, wherein the entirety of the rim is made without welding.

20. The manufacturing process according to claim 1, wherein assembling the flange and the rim comprises welding the circular flank of the rim and the flange with a first weld, and wherein the first weld is the only weld of the assembled rim and flange.

21. The manufacturing process according to claim 1, wherein the operation of forming the circular flank comprises a differing operation than the operation of expanding the formed circular flank.

* * * * *